United States Patent [19]
Gesenhaus

[11] 4,330,053
[45] May 18, 1982

[54] MESHING DEVICE FOR AN AFTER-RUNNING TRANSMISSION SHAFT

[75] Inventor: Reinhard Gesenhaus, Bergisch Gladbach, Fed. Rep. of Germany

[73] Assignee: Ford Motor Company, Dearborn, Mich.

[21] Appl. No.: 144,488

[22] Filed: Apr. 28, 1980

[30] Foreign Application Priority Data

Apr. 25, 1979 [DE] Fed. Rep. of Germany ....... 2916626

[51] Int. Cl.³ .................... F16D 67/02; B60K 41/26; F16H 57/10
[52] U.S. Cl. .................. 192/4 C; 74/411.5; 74/710.5
[58] Field of Search .............. 192/4 A, 4 C; 74/411.5, 74/710.5

[56] References Cited
U.S. PATENT DOCUMENTS 1,819,914  8/1931  Miller ............................. 192/4 A
3,165,181  1/1965  Hampton et al. ................ 192/4 C

*Primary Examiner*—George H. Krizmanich
*Attorney, Agent, or Firm*—Frank G. McKenzie; Donald J. Harrington

[57] ABSTRACT

The after-running gearwheel of a transmission is engaged by a idler gear mounted for axial movement and rotation. The idler has a conical surface that engages a complementary surface formed on a countercone, which is mounted within the bore of the idler on a common fixed shaft. The shift mechanism moves the idler and countercone forward on the shaft into engagement with the rotating gearwheel. The countercone upon being driven by friction at the mating cone surfaces is fixed against rotation, thereby developing a braking torque that operates to stop the idler and gearwheel. Upon further axial movement, the idler is brought into engagement with the gearwheel on the output shaft.

5 Claims, 3 Drawing Figures

MESHING DEVICE FOR AN AFTER-RUNNING TRANSMISSION SHAFT

BACKGROUND OF THE INVENTION

1. Field of the Invention. This invention relates to a device for braking an after-running transmission shaft. More particularly, it pertains to such a device wherein an idler gear moved axially into engagement with a rotating gear is stopped by friction force developed on a support surface before engaging a gear on a driven shaft.

2. Description of the Prior Art. German Pat. No. 20 18 399 describes a meshing device for a reverse speed gear wheel in a change-speed gearbox intended for use with motor vehicles. The gear arrangement provides a reverse drive torque delivery path wherein a sliding reverse gear mounted rotatably on a fixed axle cooperates with a second gearwheel, wider than the first, mounted on the after-running layshaft. The shaft is stopped by a brake that becomes operative during sliding. It is constructed similar to a locking synchronizer having a synchronizing cone formed on a fixed part and a mating core formed on the reverse speed gearwheel. A transverse pin engageable with two opposite longitudinal slots having widened locking edges is axially slidable and rotatable into a locking position.

However, the prior art brake device has a disadvantage in that a considerable amount of space is necessary for the arrangement of the countercone and of the spring that loads the countercone.

SUMMARY OF THE INVENTION

It is an object of this invention to produce a brake for stopping an after-running transmission that is reduced in size and complexity compared to such devices known in the art.

This object is achieved in that the after-running shaft brake has a slidable gear providing a first conical surface and a countercone having a second conical surface mounted within the hub portion of the slidable gear on a common fixed axle. A first gear wheel mounted for rotation on the after-running shaft has teeth disposed for engagement by the teeth of the slidable gear when the gear is moved axially toward the first gearwheel. A second gearwheel has gear teeth arranged for engagement with the slidable gear after it has engaged the first gearwheel. The countercone is mounted for rotation and axial motion on the axle, which has capacity for some limited sliding movement relative to the slidable gear and furnishes a second conical surface mating with the complementary surface of the gear. A pin mounted on and extending from the axle fits within longitudinal slots on the countercone to prevent its rotation when torque is transmitted between the gear and countercone, but allows axial movement when the pin is aligned with the slots.

Because the hub part of the countercone mounted on the fixed axle is arranged to extend through the bore of the sliding gear to the side remote from the other two gearwheels of the reverse drive torque path and since the sliding gear is mounted rotatably with limited axial sliding mobility on its external circumference, a minimum of space and complexity of construction is required. The hub part of the countercone, according to my invention, acts as a bearing bushing for the slidable gear. Due to the limited axial movement of the sliding gear on the hub part of the countercone, the pressure spring required in known brake devices of this type are no longer necessary.

Because the fixed axle of the reverse speed sliding gear can be produced as a cold flowed, sintered or fine cast component with appropriately incorporated guiding and locking grooves, for engagement with the locking teeth constructed on the hub part of the countercone a substantial reduction in the production costs for such a device can be achieved when compared to synchronizing devices requiring machined components.

BRIEF DESCRIPTION OF THE DRAWING

The invention is explained more fully with reference to two exemplary embodiments illustrated in the accompanying drawing, wherein.

DESCRIPTION OF THE PREFERRED EMBODIMENTS

Figure 1:
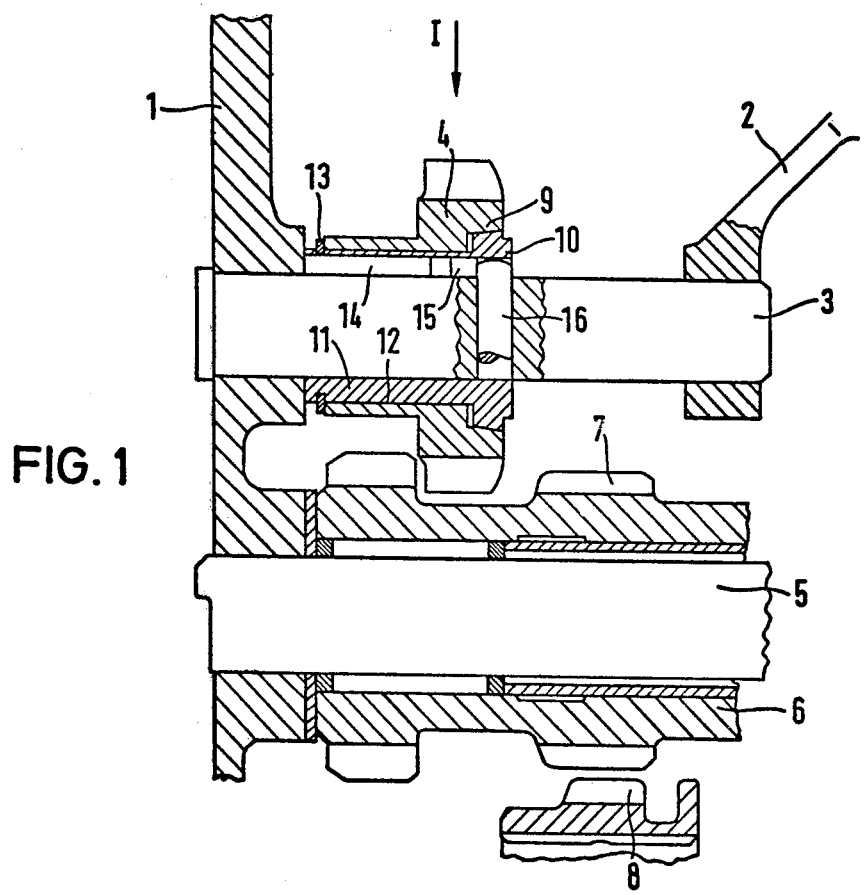
FIG. 1 shows a partial cross-section through the centerlines of three nonplanar parallel shafts in a motor vehicle change-speed gearbox in the region of the reverse speed sliding gear.

In the gearbox housing of a motor vehicle change-speed gearbox, the stationary axle 3 for a reverse speed sliding gear 4 is positioned between a housing outer wall 1 and a bearing block 2. The stationary axle 5 of a layshaft gearwheel block 6 is mounted in the external walls of the gearbox housing.

The reverse speed sliding gear 4 can be displaced axially on the axle 3 by a shift device (not shown) in a conventional manner in order to bring gear 4 into mesh initially with a wide gearwheel 7 on the layshaft gearwheel block 6 and then with a narrower gearwheel 8 on the main shaft (not shown).

The reverse speed sliding gear 4 is provided on its side confronting the two gearwheels 7 and 8 with a synchronizing cone surface 9. A countercone 10 having a surface complementary to and mating with the cone surface 9 extends through the bore 12 of the reverse speed sliding gear 4 to the side remote from gearwheels 7 and 8. The sliding gear 4 secured by ring 13 is mounted for rotation and limited axial displacement on the hub part 11 of the countercone 10. A longitudinal groove 14 having an enlarged locking edge 15 is constructed in the hub part 11 of the countercone 10 and cooperates with a transverse pin 16 secured to and extending from the fixed axle 3.

Figure 2:
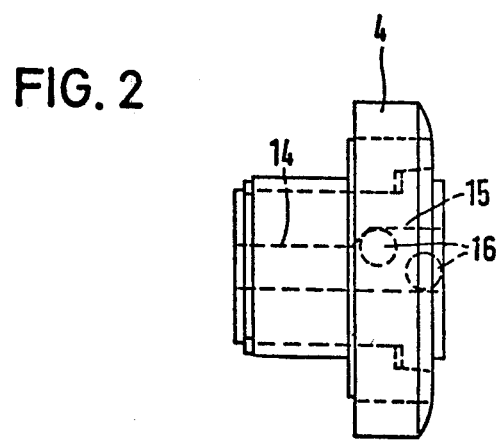
FIG. 2 shows a side view of the reverse speed sliding gear of FIG. 1, in which the cooperation of a longitudinal groove having a widened locking edge with a transverse pin is indicated.

The function of the device is explained with reference to FIG. 2. When the reverse speed sliding gear 4 is moved axially in the direction of engagement, it meshes initially into the rotating tooth system of the wide gearwheel 7 on the layshaft gearwheel block 6 and commences to rotate. Because the countercone 10 serves simultaneously as a bearing bushing for the sliding gear 4, the countercone 10 is rotated by the bearing friction into a locking position at which the transverse pin 16 abuts the locking edge 15 in the longitudinal groove 14. In this position, as a result of further pressure from the shift device on the countercone 10 and through the engagement of the transverse pin 16 on the locking edge 15, a braking torque develops which prevents movement of the reverse speed gearwheel 4. Only when the layshaft gearwheel block 6 has been braked to a full stop does the braking torque become zero. The locking edge 15 can then slide along the transverse pin 16 so that the reverse speed sliding gear 4 can be advanced further into mesh with the narrower gearwheel 8 mounted on the mainshaft.

Figure 3:
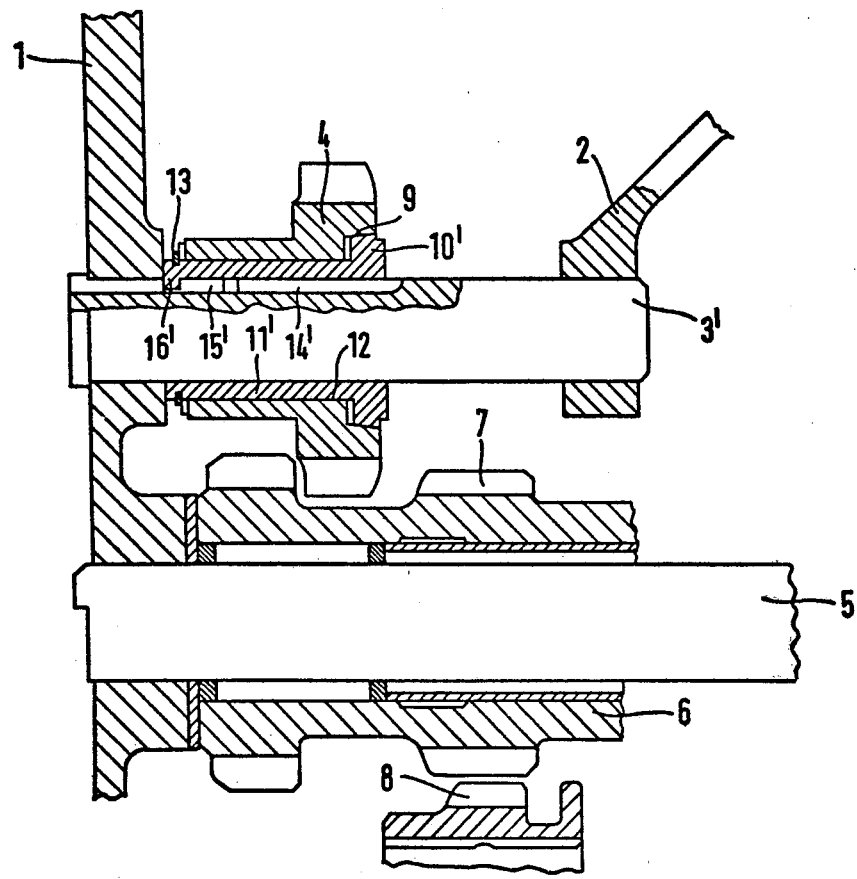
FIG. 3 shows a cross-section through the centerlines of three nonplanar parallel shafts in a motor vehicle change-speed gearbox in the region of the reverse speed sliding gear illustrating a second embodiment of the invention.

FIG. 3 shows a second, lower cost embodiment of the device according to the invention in which identical components have the same reference numerals and slightly modified components with identical function have the same reference numerals with a prime superscript.

The fixed axle 3' for the reverse speed sliding gear 4 is constructed here as a cold flowed, sintered or fine cast component in which an appropriate longitudinal groove 14' having an appropriate locking edge 15' is shaped. A countercone 10' is formed on its hub part 11' with a radially inwardly projecting locking tooth 16' which cooperates with the corresponding locking groove 14' or 15'.

The function of the device according to FIG. 3 is the same as has been explained with reference to FIGS. 1 and 2.

Having thus described a preferred embodiment of my invention, what I claim and desired to secure by U.S. Letters Patent is:

1. A braking device for a transmission shaft comprising:

a slidable gear supported on a fixed axle for rotation and axial movement having a first conical surface formed thereon;

a first gearwheel mounted for rotation having gear teeth disposed for engagement by the teeth of said slidable gear when said slidable gear is moved axially toward said first gearwheel;

a second gearwheel mounted for rotation having gear teeth disposed for engagement by the teeth of said slidable gear when said slidable gear is moved axially and after it has engaged the teeth of said first gearwheel;

a countercone mounted for rotation and axial movement on the fixed axle having a second conical surface adapted to engage the first conical surface; and means for limiting rotation of said countercone when said first and second conical surfaces are driveably engaged and torque is transmitted therebetween, but allowing axial movement of said slidable gear when no torque is applied to said slidable gear.

2. The braking device according to claim 1 wherein said rotation limiting means comprises a pin secured to and extending from the fixed axle engaging a longitudinal slot formed on said countercone whereby rotation of said countercone is prevented when said pin abuts the slot and axial movement of said countercone is allowed when said pin is aligned with the slot.

3. The braking device according to claim 1 wherein said countercone is permitted limited axial movement with respect to said slidable gear.

4. The braking device according to claim 1 wherein said countercone is mounted on said fixed axle within the hub of said slidable gear.

5. The braking device according to claim 1 wherein the fixed axle is formed of metal by cold flowing, sintering or fine casting processes.

* * * * *